Aug. 8, 1950     R. A. WILLIAMS     2,518,106
TRIM STRIP APPLICATOR TOOL
Filed July 14, 1948
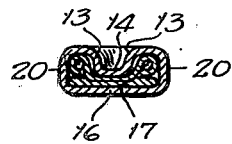
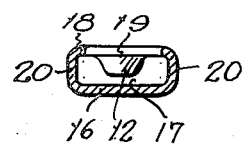
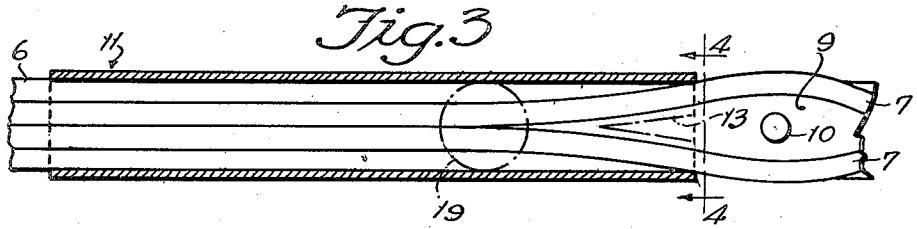
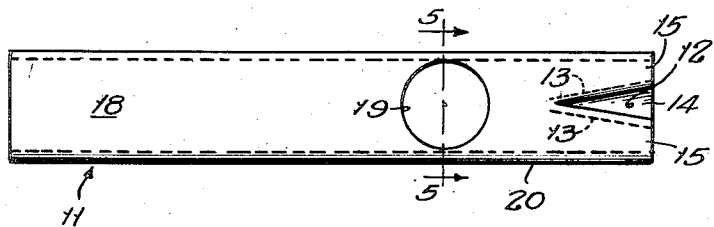
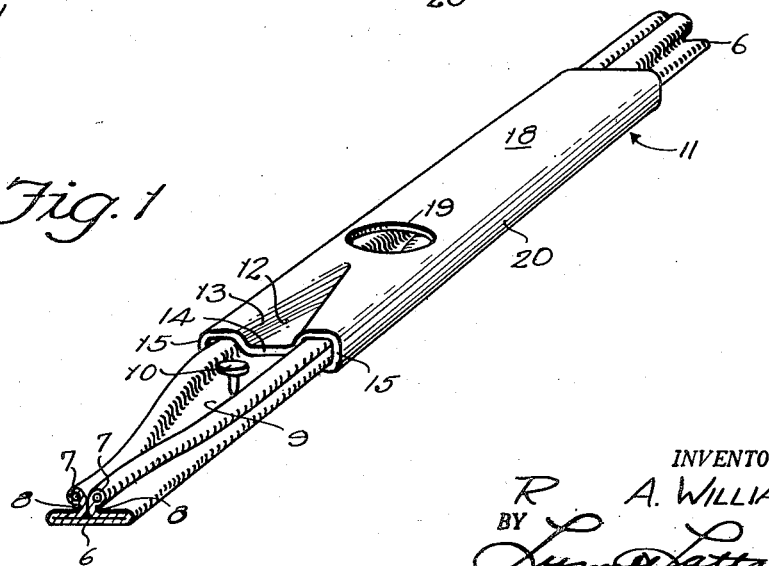
INVENTOR.
R. A. WILLIAMS
BY
—ATTORNEY—

Patented Aug. 8, 1950

2,518,106

UNITED STATES PATENT OFFICE 2,518,106

TRIM STRIP APPLICATOR TOOL

Ralph A. Williams, West Hollywood, Calif.

Application July 14, 1948, Serial No. 38,651

2 Claims. (Cl. 1—47)

This invention relates to a tool for applying trim stripping to upholstered articles such as chairs, davenports, automobile seats, etc. The invention relates specifically to the application of a trim strip of the type having a pair of beads connected to a base tape by flexible webs, normally in contact with each other, but adapted to be spread apart in order to permit the driving of tacks between them and through the base tape.

The object of the invention is to provide a tool that will spread the beads apart at a spot where a tack is to be applied. A further object is to provide a tool that will progressively spread the beads throughout the length of a trim strip as it is moved along the strip. A further object is to provide a tool that will embrace the strip and maintain itself in proper engagement therewith so as to effectively maintain the spreading of the beads thereof. A further object is to provide a tool that may be easily manipulated by a workman and has means for permitting the workman to grasp the strip itself in order to place it under tension, with the same hand that is grasping the tool, so that the other hand may be left free to manipulate a tack hammer.

A further object is to provide a tool, which, in addition to the above characteristics, is quite simple and inexpensive in construction.

Other objects will become apparent in the ensuing specifications and appended drawings in which:

Fig. 1 is a perspective view illustrating a tool embodying my invention, operating upon a trim strip;

Fig. 2 is a plan view of the tool;

Fig. 3 is a plan sectional view showing the tool operating on a trim strip;

Fig. 4 is a transverse sectional view taken on the line 4—4 of Fig. 3; and

Fig. 5 is a transverse sectional view taken on the line 5—5 of Fig. 2.

Referring now to the drawings in detail, I have shown in Figs. 1, 3 and 4 a trim strip of a conventional type having a base tape portion 6 and a pair of beads 7 connected to the base tape portion 6 by flexible webs 8 which normally maintain the beads 7 yieldingly pressed against each other but are capable of being spread apart in order to permit the beads 7 to separate to provide a space 9 for receiving a tack 10 when the trim strip is being applied to an upholstered article.

My improved tool is constructed from a short length of tubing which may be of metal or plastic material or any other suitable material to which may be imparted a fairly rigid, permanent shape.

In the finished form of the tool, the tube is of rectangular cross section as shown in Figs. 4 and 5. It has a handle portion 11 of plain rectangular tubular shape, extending from one end to a point somewhat beyond its center. The other end has a triangular shaped indentation providing a wedge 12 defined by outwardly diverging shoulders 13 and a web portion 14. Between the wedge 12 and the side walls 20 of the tool there is defined a pair of nozzles 15 through which the bead members 7 emerge as the tool is moved along the trim strip. The web member 14 is spaced from the bottom wall 16 of the tool to provide a flat shallow passage 17 (Fig. 5) which joins the nozzle 15. The passage 17 accommodates the tape portion 6 of the trim strip. The passage 17 is just sufficiently deep to permit the tape portion 6 to pass therethrough with slight clearance.

Between the wedge 12 and the shank portion 11, in the top wall 18, is an opening 19 which is sufficiently large in diameter to permit the thumb of an ordinary person to be passed therethrough into engagement with the trim strip within the tool.

In using the tool, the trim strip is inserted into the handle end 11 of the tool and moved up to the opening 19. A finger is then inserted through the opening 19 to spread the beads 7 apart sufficiently to guide them into the nozzles 15. The trim strip is then advanced through the tool, the two beads 7 being spread apart by the diverging shoulders 12 of the nozzles 15, until the spread end of the trim strip emerges from the nozzle. Holding the tool in the left hand, the operator then inserts a tack 10 into the space 9 between the spread portions of the beads 7, pushes it into the tape base 6 of the trim strip and then drives it into the article being trimmed, using an ordinary tack hammer. He then draws the tool rearwardly, allowing the beads 7 to close over the head of the tack that has just been inserted, and, when the tool has been moved a distance corresponding to the desired spacing between tacks, the operator inserts through the opening 19, the thumb of the hand in which the tool is being held, grips the trim strip and pulls it rearwardly to apply the desired amount of tension thereto. Another tack is then inserted and driven home. These operations are repeated throughout the length of the strip, the beads closing over the tack heads as the tool is moved away from them.

A prime advantage of the tool is the arrangement of the web portion 14 in closely spaced relation to the bottom wall 16 of the tool, so as to positively maintain the wedge 12 in the trough between the beads 7, and prevent any possibility of the wedge slipping from between the beads so as to necessitate its being reinserted. This is a common failing of tools now available for this purpose.

Another advantage of the tool is the arrangement by which it is possible to directly engage the trim strip with the thumb of the hand in which the tool is being held and to apply tension to the strip, while the other hand is left free to wield a tack hammer.

I claim:

1. A tool for applying a trim strip of a type including a tape-like base portion and a pair of beads connected thereto by flexible webs normally lying in yielding engagement with one another, said tool comprising a section of flattened tubing having a top wall, a bottom wall and side walls and having in said top wall, at one end of the tool, a triangular shaped depression which provides a wedge adapted to enter between and spread said beads apart to permit a tack to be driven through the tape portion, said wedge including a pair of shoulder walls joined at their inner ends by an apex portion merging with the flat wall of said tube, said shoulders diverging to the end of the tool, and a web portion joining said shoulder walls and spaced from the bottom wall of the tool to define a narrow flat passage, said shoulder walls being spaced from the side walls to define a pair of nozzles that diverge and are increasingly constricted toward the end of the tool, the beads being received and confined in said nozzles as they are spread apart by said wedge, and said web defining with said bottom wall a shallow flat space joining said nozzles and accommodating the tape portion of said trim strip while said beads are being spread apart.

2. A tool as defined in claim 1, wherein said tool is provided, adjacent the apex of said wedge, with an aperture adapted to receive the thumb of the hand in which the tool is held, in order that the thumb may directly engage the trim strip to apply a tension thereto.

RALPH A. WILLIAMS.

REFERENCES CITED

The following references are of record in the file of this patent:

UNITED STATES PATENTS

| Number | Name | Date |
|---|---|---|
| 1,508,695 | Hill | Sept. 16, 1924 |